(12) United States Patent
Sato

(10) Patent No.: US 12,229,089 B2
(45) Date of Patent: Feb. 18, 2025

(54) ELECTRONIC DEVICE, DATA PROCESSING METHOD AND STORAGE MEDIUM

(71) Applicant: CASIO COMPUTER CO., LTD., Tokyo (JP)

(72) Inventor: Hiroki Sato, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 168 days.

(21) Appl. No.: 17/989,597

(22) Filed: Nov. 17, 2022

(65) Prior Publication Data

US 2023/0169047 A1    Jun. 1, 2023

(30) Foreign Application Priority Data

Nov. 30, 2021  (JP) .................................. 2021-194314

(51) Int. Cl.
   *G06F 17/00*  (2019.01)
   *G06F 7/00*   (2006.01)
   *G06F 16/13*  (2019.01)
   *G06F 16/185* (2019.01)

(52) U.S. Cl.
   CPC ............ *G06F 16/185* (2019.01); *G06F 16/13* (2019.01)

(58) Field of Classification Search
   CPC ................ G06F 16/185; G06F 16/13
   USPC ........................................ 707/609
   See application file for complete search history.

(56) References Cited

U.S. PATENT DOCUMENTS

| | | | |
|---|---|---|---|
| 2002/0002898 A1* | 1/2002 | Schmitz | G10H 1/0058 84/645 |
| 2003/0061225 A1* | 3/2003 | Bowman | G06F 16/10 |
| 2003/0061246 A1* | 3/2003 | Bowman | G06Q 10/10 |
| 2005/0108215 A1* | 5/2005 | Thomas | G06F 16/58 707/E17.031 |
| 2005/0108265 A1* | 5/2005 | Langkafel | G06F 16/258 |

FOREIGN PATENT DOCUMENTS

JP          2009-222772 A     10/2009

* cited by examiner

*Primary Examiner* — Pavan Mamillapalli
(74) *Attorney, Agent, or Firm* — CHEN YOSHIMURA LLP

(57) ABSTRACT

An electronic device includes at least one processor configured to perform: receiving a selection operation from a user that selects one of a plurality of data types for a first data, the first data having a hierarchical structure, the plurality of data types being different from each other at least in terms of a way the first data is associated with a second data that is described at a different level in the hierarchical structure; and adapting the first data in accordance with the data type selected by the selection operation, and causing the adapted first data to be saved in a memory.

17 Claims, 13 Drawing Sheets

| Registration Number | File name | Number of tone Physical data | Data size (Byte) |
|---|---|---|---|
| 1 | SONG1 Brass | 4 | 900 |
| 2 | SONG1 Piano | 0 | 100 |
| 3 | Electric Guiter | 2 | 500 |
| 4 | Jazz Organ | 1 | 300 |
| ⋮ | ⋮ | ⋮ | ⋮ |
| 200 | Test Data | 3 | 700 |

ELECTRONIC DEVICE, DATA PROCESSING METHOD AND STORAGE MEDIUM

BACKGROUND OF THE INVENTION

Technical Field

The present disclosure relates to an electronic device, data processing methods, and storage media.

Background Art

Some data handled by electronic musical instruments have a hierarchical structure. As an example of this kind of data, registration data is known as disclosed in Japanese Patent Application Laid-Open No. 2009-222772.

The registration data includes, for example, data indicating a timbre called tone data. A user can select registration data and play the electronic musical instrument with a tone that is set according to the selected registration data.

Registration data includes a data inclusion type in which the registration data itself contains tone physical data, and a reference type in which the registration data itself does not contain tone physical data. The reference-type registration data describes the number of tone data to be referred to. The electronic musical instrument reads the tone data that is referred to and sets the tone according to the registration data. In the reference type, the data size of the registration data can be reduced to the extent that the actual tone data is not included.

SUMMARY OF THE INVENTION

The present disclosure has been made in view of the above circumstances, and one of its advantages is to provide an electronic device, a data processing method, and a storage medium that can easily handle data having a hierarchical structure.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic device, comprising at least one processor configured to perform the following: receiving a selection operation from a user that selects one of a plurality of data types for a first data, the first data having a hierarchical structure, the plurality of data types being different from each other at least in terms of a way the first data is associated with a second data that is described at a different level in the hierarchical structure; and adapting the first data in accordance with the data type selected by the selection operation, and causing the adapted first data to be saved in a memory.

In another aspect, the present disclosure provides a method performed by at least one processor in an electronic device, comprising: receiving a selection operation from a user that selects one of a plurality of data types for a first data, the first data having a hierarchical structure, the plurality of data types being different from each other at least in terms of a way the first data is associated with a second data that is described at a different level in the hierarchical structure; and adapting the first data in accordance with the data type selected by the selection operation, and causing the adapted first data to be saved in a memory.

In another aspect, the present disclosure provides a non-transitory computer-readable recording medium storing a program therein, the program being configured to cause at least one processor in an electronic device to perform the following: receiving a selection operation from a user that selects one of a plurality of data types for a first data, the first data having a hierarchical structure, the plurality of data types being different from each other at least in terms of a way the first data is associated with a second data that is described at a different level in the hierarchical structure; and adapting the first data in accordance with the data type selected by the selection operation, and causing the adapted first data to be saved in a memory.

Embodiments of the present disclosure include an electronic musical instrument, a data processing method, and a storage medium that can facilitate handling of data having a hierarchical structure.

It is to be understood that both the foregoing general description and the following detailed description are exemplary and explanatory, and are intended to provide further explanation of the invention as claimed.

BRIEF DESCRIPTION OF THE DRAWINGS

FIG. 5 is a diagram showing an example of a registration directory.

DETAILED DESCRIPTION OF EMBODIMENTS

An electronic musical instrument will be described in detail as an example of an electronic device according to an embodiment of the present disclosure with reference to the drawings.

Figure 1:
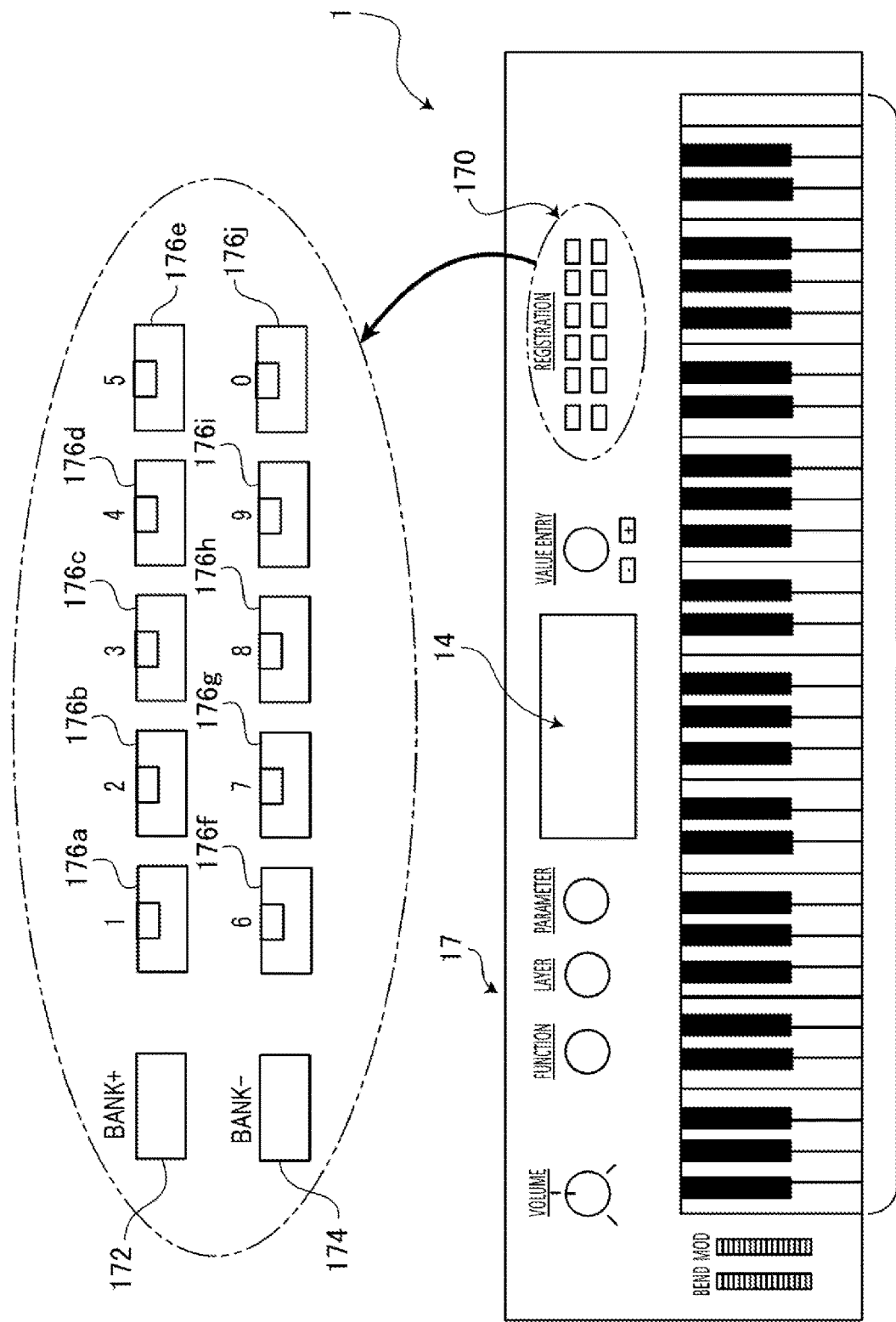
FIG. 1 is a diagram showing the appearance of an electronic musical instrument according to an embodiment of the present disclosure.
Figure 2:
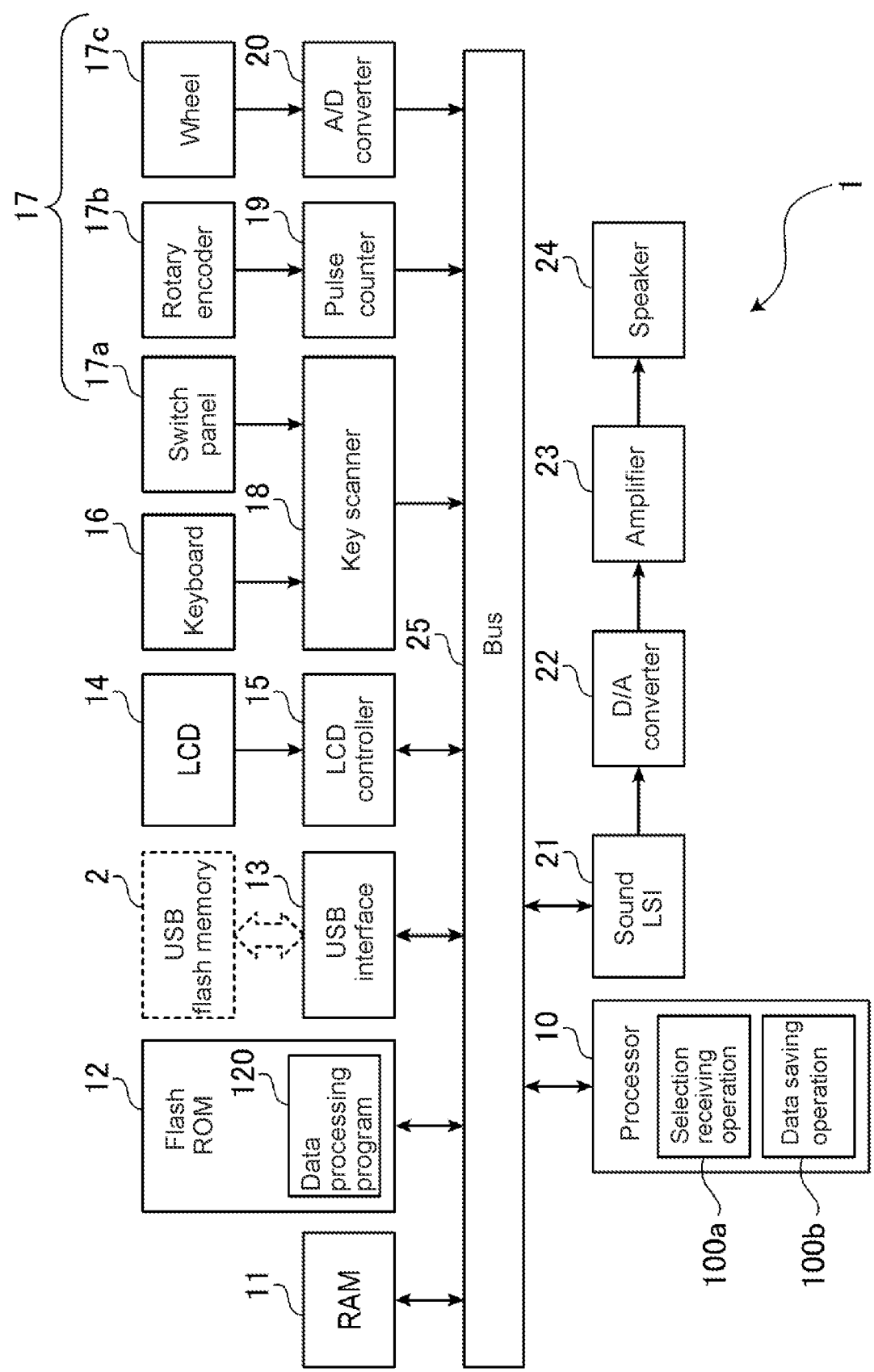
FIG. 2 is a block diagram showing the configuration of an electronic musical instrument according to the embodiment of the present disclosure.

FIG. 1 is a diagram showing the appearance of an electronic musical instrument 1 according to an embodiment of the present disclosure. FIG. 2 is a block diagram showing the configuration of the electronic musical instrument 1. The electronic musical instrument 1 is, for example, an electronic keyboard incorporating a synthesizer tone generator. The electronic musical instrument 1 may be an electronic instrument other than an electronic keyboard; it may be an electronic percussion instrument, an electronic wind instrument, or an electronic string instrument.

The electronic musical instrument 1 has a hardware configuration including at least one processor 10, a RAM (Random Access Memory) 11, a flash ROM (Read Only Memory) 12, a USB (Universal Serial Bus) interface 13, an LCD (Liquid Crystal Display) 14, an LCD controller 15, keyboard 16, operation unit 17, key scanner 18, pulse counter 19, A/D converter 20, sound source LSI (Large Scale Integration) 21, D/A converter 22, amplifier 23, and speaker 24. Each of these parts of the electronic musical instrument 1 is connected by a bus 25.

The processor 10 reads programs and data stored in the flash ROM 12 and uses the RAM 11 as a work area to control the electronic musical instrument 1 in a comprehensive manner.

The processor 10 is, for example, a single processor or a multiprocessor and includes at least one processor. In the configuration including a plurality of processors, the processor 10 may be packaged as a single device, or may be composed of a plurality of physically separated devices within the electronic musical instrument 1.

The processor 10 includes, as functional blocks, a selection operation receiving process 100a that receives a user's selection operation to select one data type from a plurality of data types, each of which is first data having a hierarchal structure using a second data lower in a lower hierarchal level, and a data saving operation process 100b that causes the first data to be saved in a storage unit(s) based on the data type selected by the selection operation. The operation of these functional blocks makes it easier for the electronic musical instrument 1 to handle data having a hierarchical structure. A data processing method and a storage medium according to an embodiment of the present disclosure are realized by causing the processor 10 to execute the functional blocks of respective types of processing. The processor 10 is an example of a computer that can access the flash ROM 12, which is an example of the storage unit.

The RAM 11 temporarily holds data and programs. The RAM 11 holds programs and data read from the flash ROM 12 and other data necessary for communication.

The flash ROM 12 functions as a storage medium, is a non-volatile semiconductor memory such as flash memory, EPROM (Erasable Programmable ROM), EEPROM (Electrically Erasable Programmable ROM), etc., and plays a role as a secondary storage device or an auxiliary storage device. The flash ROM 12 stores programs and data, including a data processing program 120, used by the processor 10 to perform various processes.

In this embodiment, each functional block of the processor 10 is implemented by a data processing program 120 that is software. Note that each functional block of the processor 10 may be partially or wholly realized by hardware such as a dedicated logic circuit.

The USB interface 13 is an interface to which a USB flash memory 2, which is an example of an external storage medium, can be connected.

The LCD 14 is an example of a display device. The LCD 14 is driven by LCD controller 15. When the LCD controller 15 drives the LCD 14 according to the control signal from the processor 10, a screen corresponding to the control signal is displayed on the LCD 14. The LCD 14 may be replaced with a display device such as an organic EL (Electro Luminescence) or an LED (Light Emitting Diode). The LCD 14 may be a touch panel. In this case, the touch panel may serve as both an input device and a display device.

The keyboard 16 is a keyboard having a plurality of white keys and black keys as a plurality of performance operators. Each key is associated with a different pitch.

The operation unit 17 includes operators such as switches, buttons, knobs, rotary encoders, wheels, touch panels, etc., of mechanical type, capacitance non-contact type, membrane type, and the like. FIG. 2 shows a switch panel 17a, a rotary encoder 17b, and a wheel 17c as examples of operating elements included in the operation unit.

As a more specific example, the operation unit 17 includes a pitch bend wheel, a modulation wheel, a volume knob, a function rotary encoder, a layer rotary encoder, a parameter rotary encoder, a data entry section, and a registration section 170.

The pitch bend wheel is an operator for generating the pitch bend effect. The modulation wheel is an operator for generating a vibrating sound effect such as vibrato. The volume knob is an operator for adjusting the volume. The function rotary encoder is an operator for selecting a function to change settings. The layer rotary encoder is an operator for selecting a layer whose settings are to be changed. The parameter rotary encoder is an operator for selecting parameters included in the selected function. The data entry section includes a rotary encoder and "+" and "–" keys for changing the value of the selected parameter. The registration section 170 is an operator for selecting registration data.

As shown in the enlarged view of FIG. 1, the registration section 170 includes a "BANK+" key 172 and a "BANK–" key 174 and ten number buttons 176a through 176j for "1" through "9" and "0", respectively.

In this embodiment, 200 pieces of registration data are stored in the flash ROM 12. The 200 pieces of registration data are divided into a total of 20 groups selectable by the 'BANK+' key 172 and the 'BANK–' key 174. Each group stores 10 pieces of registration data. The user selects one group by operating the "BANK+" key 172 and the "BANK–" key 174, and presses one of the number buttons 176a to 176j to select one registration data from the selected group. Information on the selected group and registration data is displayed on the LCD 14, for example.

The key scanner 18 monitors key depression and key release on the keyboard 16 and operations on some of the operators included in the operation unit 17. The key scanner 18 outputs key depression event information to the processor 10, for example, upon detecting a key depression operation by the user. The key depression event information includes pitch information (key number) of the key associated with the key depression operation. A key number is also called a key number, a MIDI key, or a note number.

Note that a unit for measuring the key pressing speed (velocity value) may be separately provided, and the velocity value may be included in the key pressing event information. As the key pressing speed measuring unit, for example, two or three contact switches may be provided for each key so as to measure differences in the time when these contact switches are successively turned on when the key is pressed. The velocity value can also be said to be a value that indicates the strength of the key depression operation.

The pulse counter 19 is a device that detects movements of various rotary encoders (referred to as "rotary encoder 17*b*" in FIG. 2).

The A/D converter 20 is a device that converts analog voltages corresponding to volume positions of various wheels (referred to as "wheel 17*c*" in FIG. 2) into digital data.

The processor 10 instructs the sound source LSI 21 to read the corresponding waveform data out of the plurality of waveform data stored in the flash ROM 12. The waveform data to be read out is determined according to, for example, the tone color selected by the user's operation and the key depression event information.

The sound source LSI 21 generates musical tones based on waveform data read from the flash ROM 12 under instructions from the processor 10. The sound source LSI 21 has, for example, 128 generator sections, and can generate up to 128 musical tones simultaneously. Although the processor 10 and the sound source LSI 21 are configured as separate devices in this embodiment, the processor 10 and the sound source LSI 21 may be configured as one processor in another embodiment.

A digital audio signal of a musical tone generated by the sound source LSI 21 is converted into an analog signal by the D/A converter 22, amplified by the amplifier 23 and output from the speaker 24.

In this embodiment, the operation of the functional blocks of the processor 10 makes it easier for the electronic musical instrument 1 to handle data having a hierarchical structure. In this embodiment, registration data is given as an example of data having a hierarchical structure (first data). Schematically, the registration data has a hierarchical structure having a hierarchically lower level data. In the present embodiment, tone data is given as an example of lower level data (second data) of the registration data. The flash ROM 12 operates as a storage section that stores registration data that can be processed by the electronic musical instrument 1.

Registration data is environment setting data that include the settings related to the overall operation of performance and sound. In this embodiment, four timbres (in other words, four tone data) can be designated simultaneously by registration data. By using such registrations, the user can perform a layered performance in which up to four timbres are superimposed.

Figure 3:
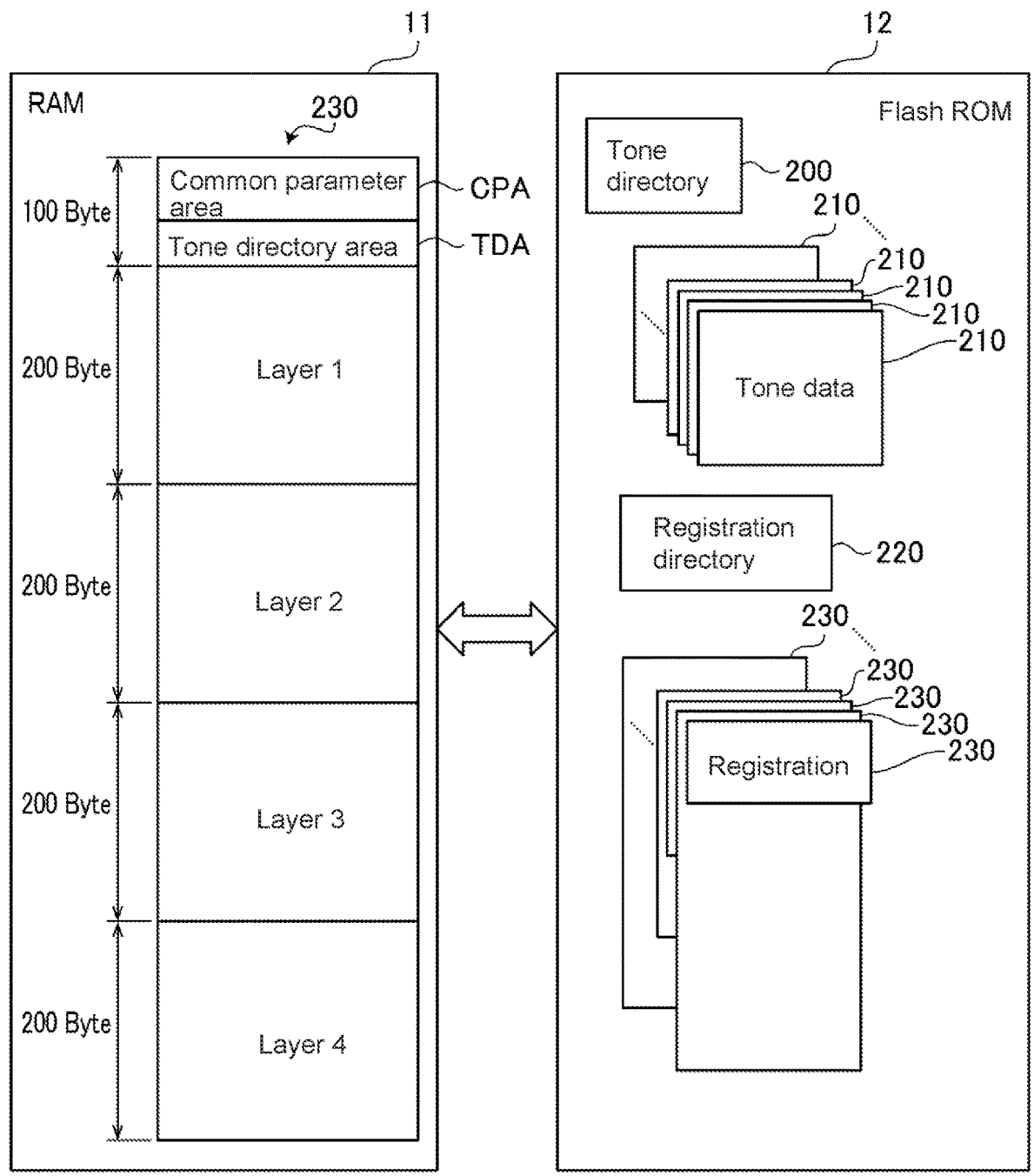
FIG. 3 is a diagram for explaining registration data and tone data.

FIG. 3 is a diagram for explaining registration data and tone data. FIG. 3 shows one registration data 230 loaded into the RAM 11, which is a work area, and a group of data stored in the flash ROM 12.

As shown in FIG. 3, the data group stored in the flash ROM 12 includes a tone directory 200, a plurality of tone data 210, a registration directory 220, and a plurality of registration data 230.

The tone data 210 is a collection of parameters related to timbre. The data size of the tone data 210 is, for example, 200 bytes. The maximum number of tone data 210 that can be stored in the flash ROM 12 is, for example, 1,000. The number of tone data 210 stored in the flash ROM 12 increases or decreases by operations of newly creating, duplicating, and deleting.

As shown in FIG. 3, the registration data 230 loaded into the RAM 11 has common parameter area CPA, tone directory area TDA, and physical data of up to four tone data corresponding to four layers 1-4. Hereinafter, for the sake of convenience, the physical data of tone data will be referred to as "tone physical data".

Figure 4:
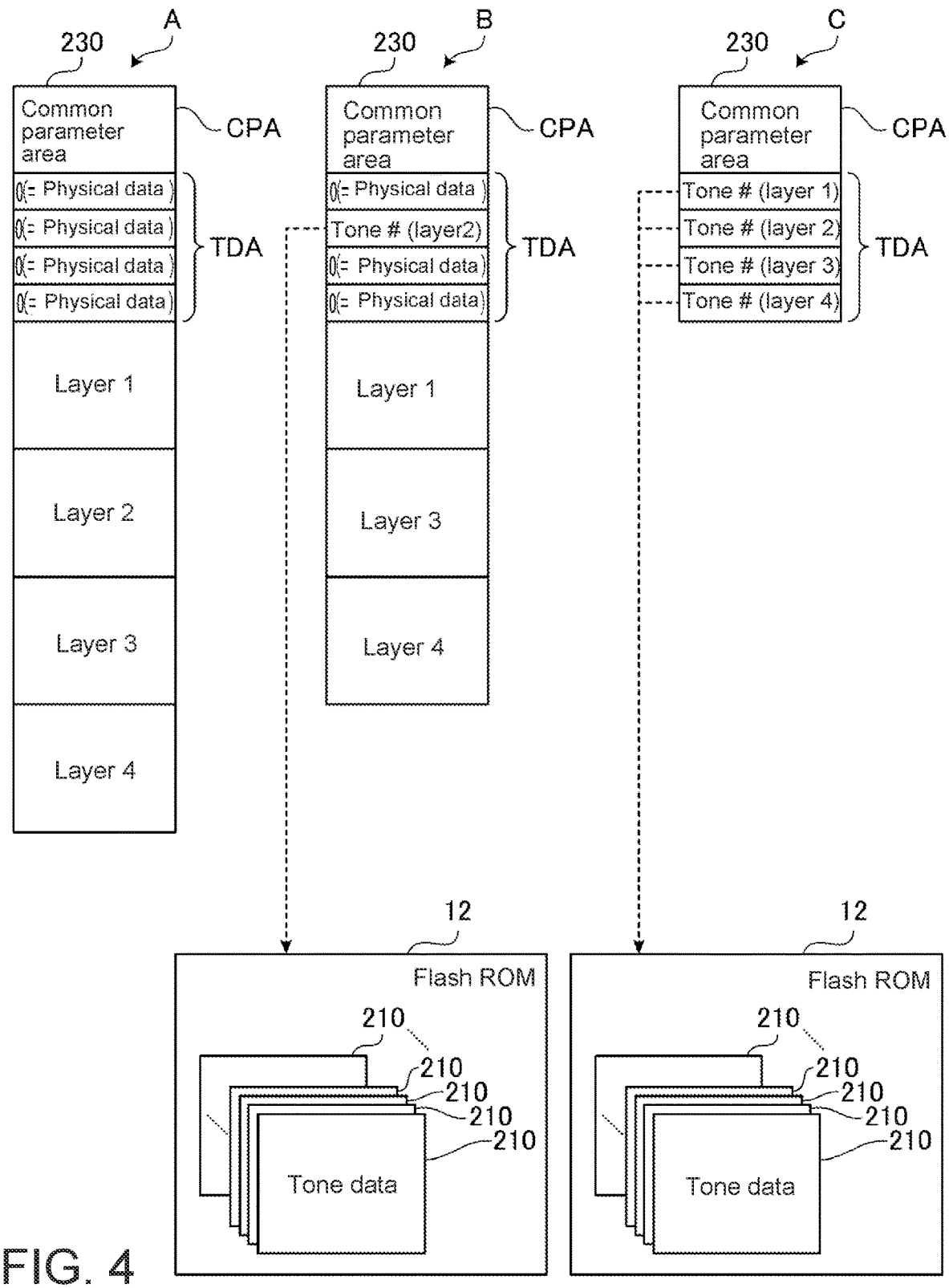
FIG. 4 is a diagram exemplifying the data type of registration data.

The flash ROM 12 stores registration data 230 of a plurality of data types. FIG. 4 illustrates data types of the registration data 230 stored in the flash ROM 12.

As indicated by symbol A in FIG. 4, as one data type, the flash ROM 12 stores registration data 230 having a total of four tone physical data corresponding to layers 1-4. The data type having tone physical data for at least some of the layers is referred to as "data inclusion type". For convenience, the registration data 230 having tone physical data corresponding to all layers 1 to 4 is referred to as "all-inclusive registration data 230".

When loading the all-inclusive registration data 230 into the RAM 11, the processor 10 copies the registration data 230 itself to the RAM 11. This allows the user to perform using the registration data 230.

As indicated by symbol B in FIG. 4, as another data type, the flash ROM 12 stores registration data 230 that has one or more and three or less tone physical data and that is a mixture of the data inclusion type and the reference type. The reference type is a layer data type that does not have tone physical data. In the reference type, the tone number assigned to the tone data 210, which is the reference destination, is described in the tone directory area TDA instead of having actual tone physical data. The tone number described in the tone directory area TDA is reference information for referring to tone data 210, which is an example of the second data.

Here, the tone directory area TDA manages whether or not there is tone physical data and the tone number indicating the reference destination tone data 210. Specifically, the tone directory area TDA specifies a value of 0 to 1000 associated with each layer. A value of 0 indicates that it has tone physical data. Values 1 to 1000 indicate tone numbers of tone data 210 stored in flash ROM 12.

In the example of symbol B in FIG. 4, the value "0, 99, 0, 0" are described in the tone directory area TDA, and these values indicate the information for layers 1 to 4 in that order. Specifically, the leading value 0, the third value 0, and the fourth value 0 indicate information of layers 1, 3, and 4, respectively. The value 99 indicates layer 2 information. In this example, the registration data 230 includes tone physical data for the layers 1, 3 and 4, and indicates that the reference destination for the layer 2 is a tone data 210 having the tone number 99. Here, all values other than the value 0 indicate tone numbers.

Thus, the registration data 230 indicated by symbol B in FIG. 4 is registration data 230 in which the reference type and the data inclusion type are mixed. For convenience, such registration data 230 is referred to as "mixed-type registration data 230".

When loading the mixed-type registration data 230 into the RAM 11, the processor 10 copies the registration data 230 itself to the RAM 11. During use of registration data 230, processor 10 will read tone data 210 from flash ROM 12 as needed for reference-type layers.

When the mixed-type registration data 230 is loaded into the RAM 11, the processor 10 may read the tone data 210 indicated by the tone number described in the tone directory area TDA from the flash ROM 12 and copy it to the corresponding layer. In this case, the registration data 230 on the RAM 11 is in the same state as the all-inclusive type. Therefore, the processor 10 can use the registration data 230 only by reading the registration data 230 that has been loaded into the RAM 11 (from another point of view, without reading the flash ROM 12). As a result, processing speeds up.

As indicated by symbol C in FIG. 4, as another data type, the flash ROM 12 stores reference-only registration data 230 that does not have any tone physical data. For convenience, the reference-only registration data 230 is referred to as "all-reference-type registration data 230".

When loading the all-reference-type registration data 230 into the RAM 11, the processor 10 copies the registration data 230 itself to the RAM 11. The processor 10 will read the tone data 210 from the flash ROM 12 as needed for each layer while using the registration data 230.

The data size of the registration data 230 differs depending on how many tone physical data it holds. That is, the registration data 230 is variable length data. For example, the data size of all-reference-type registration data 230 that does not have any tone physical data is 100 bytes. The data size of all-inclusive registration data 230 having four tone physical data is 900 bytes.

In this embodiment, the area in the flash ROM 12 that is allocated for the registration data 230 is 100,000 bytes. Therefore, if all the registration data 230 are of the all-inclusive type, the flash ROM 12 can store up to 111 registration data 230. However, in view of the efficiency of data, it is thought that there are many cases where the reference type is applied. Therefore, in this embodiment, the maximum number of registration data 230 that can be stored in the flash ROM 12 is set to 200, and the maximum number of tone physical data that can be included in all the registration data 230 is set to 400. In this case, up to 100 vall-inclusive registration data 230 can be stored in flash ROM 12.

All the data in the flash ROM 12 is managed by a file system. Therefore, each of the plurality of tone data 210 is treated as one file. Each of the plurality of registration data 230 is also handled as one file. These data are managed by file names instead of addresses.

The tone directory 200 is a directory for associating the tone number assigned to each tone data 210 with the file name. The registration directory 220 is a directory for associating a number assigned to each registration data 230 (hereinafter referred to as "registration number") with a file name.

FIG. 5 is a diagram showing an example of the registration directory 220. The registration directory 220 manages the registration data 230 by associating the registration number, the file name, the number of tone physical data contained, and the data size (unit: bytes).

Conventionally, when changing one tone data shared by a plurality of registration data, the timbre/tone color is changed in all of the registration data that refer to the changed tone data. If the user did not want to change the tone color in some of these registration data, the user had to search for all of the registration data that have been affected and had to edit these registration data so that the timbre is not changed unintentionally. Such work imposes a heavy burden on the user.

Also, when copying registration data to another compatible electronic musical instrument, passing it to other users, or uploading and sharing it on a network, the tone data referenced by the registration data could not be omitted and needed to be copied or like. However, such work is cumbersome for users. Furthermore, in order to use registration data, tone data and registration data, which are separate and independent data, must be managed as a set. Therefore, the mixed-type registration data including the reference-type registration data and the all-reference-type registration data are inconvenient in terms of portability.

On the other hand, with all-inclusive registration data, there is no need to duplicate tone data, and there is no need to manage separate tone data as a separate data. For example, simply by copying registration data alone to another electronic musical instrument, the registration data can be used in another electronic musical instrument. Therefore, all-inclusive registration data is excellent in terms of portability.

However, since it is not a data structure in which multiple registration data share and refer to one tone data, there may be cases where multiple registration data contain the same tone data, or a single registration data contains the same tone data in a plurality, for example. Therefore, this data structure is inferior to reference types in terms of efficient data management. The large data size puts pressure on the memory, and a large amount of data transfer when switching registration data may cause the processing load to increase undesirably.

Therefore, in this embodiment, the data processing program 120 described below is executed. Execution of the data processing program 120 makes it easier for the electronic musical instrument 1 to handle the registration data 230.

Figure 6:
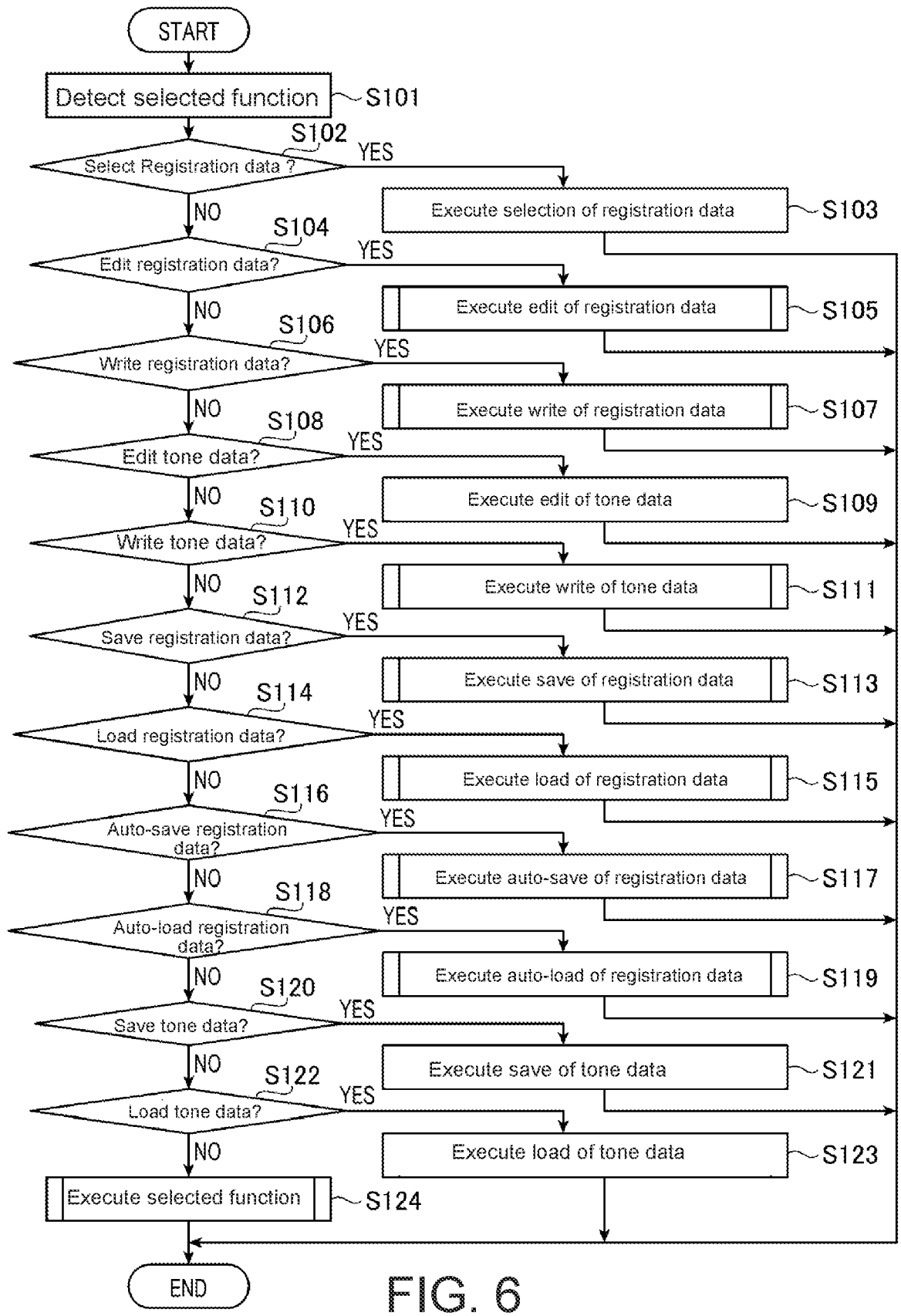
FIG. 6 is a flow chart showing processing of a data processing program executed by a processor of an electronic musical instrument in an embodiment of the present disclosure.

FIG. 6 is a flow chart showing processing of the data processing program 120 executed by the processor 10 in one embodiment of the present disclosure. For example, when the user operates the function rotary encoder, execution of the data processing program 120 is started.

The processor 10 detects a function that is set by operating the function rotary encoder (step S101).

The processor 10 determines whether the function detected in step S101 is the selection function for the registration data 230 (step S102).

If the function detected in step S101 is the selection function of the registration data 230 (step S102: YES), the processor 10 executes the selection process of the registration data 230 (step S103).

Specifically, the processor 10 accepts operations on the registration section 170. The user can select the bank that manages the registration data 230 by pressing the 'BANK+' key 172 or the 'BANK−' key 174, for example. The bank being selected is displayed on the LCD 14. When the user presses one of the number buttons 176a-176j, the selection for the registration data 230 is confirmed.

When the selection for the registration data 230 is confirmed, the processor 10 acquires the corresponding registration number. The processor 10 reads the registration data 230 to which the acquired registration number is assigned (in other words, the registration data 230 selected by the selection operation) from the flash ROM 12, transfers it to and loads it into the RAM 11, and performs the processing according to this flowchart. The processor then terminates the process of this flowchart.

If the function detected in step S101 is the editing function of registration data 230 (step S102: NO and step S104: YES), the processor 10 executes an editing process for editing registration data 230 (step S105). The registration data 230 to be edited is, for example, the registration data 230 selected by the selection function and loaded into the RAM 11.

The user can edit the parameters defined in the common parameter area CPA of the registration data 230 by operating the operation unit 17. The editable parameters are, for example, the file name of registration data 230, mode, and the tone number.

In the common parameter area CPA, the mode of each layer 1 to 4 is defined. The mode of each layer 1-4 indicates the data type of the tone corresponding to each layer 1-4.

The data types indicated by modes include two reference types and one data inclusion type. One of the reference types is a content-dependent reference type (first reference type). Another reference type is a content-guaranteed reference type (second reference type). Mode 0 indicates a content-dependent reference type. Mode 1 indicates a content-guaranteed reference type. Mode 2 indicates a data inclusion type.

For example, when "0012" is described in the common parameter area CPA as the mode value, this value is the information of layers 1 to 4 arranged in order. Specifically, the leading value 0 and the following value 0 indicate layer 1 and layer 2 information, respectively. The value of 1 indicates layer 3 information. The value of 2 indicates layer 4 information. In this example, layers 1 and 2 are defined as the content-dependent reference types, layer 3 is defined as the content-guaranteed reference types, and layer 4 is defined as the data inclusion types.

When the content of the tone data 210 shared (referred to by) by a plurality of registration data 230 is changed, among all the layers of the registration data 230 describing this tone data 210 as the reference destination, for the layers describing it as a content-dependent reference type, the tone number described as the reference destination in the tone directory area TDA is not changed. Therefore, the registration data 230 including such layers are affected by the change in timbre accompanying the change in the tone data 210.

On the other hand, among all the layers of the registration data 230 in which the tone data 210 is described as the reference destination, for the layers describing it as the content-guaranteed reference type, the tone number in the tone directory area TDA as a reference destination is modified in the following manner.

Specifically, when the content of the tone data 210 is changed and saved, the processor 10 creates a copy of the tone data 210 before change, assigns a new tone number, and saves it in the flash ROM 12. For a layer defined as the content-guaranteed reference type, the tone number described in the tone directory area TDA is rewritten with the new tone number assigned to the duplicated tone data 210 (which is the original tone data 210 before being changed). Because of such a rewriting process, in a layer defined as the content-guaranteed reference type, the content of the reference destination tone data 210 remains the same as before the change. Therefore, such registration data 230 is not affected by changes in tone color caused by changes in tone data 210.

In this way, when the tone data 210 (second data) referenced by the content-guaranteed reference type (second reference type) is changed, the processor 10 duplicates the tone data 210 before the change, The tone number (reference information) indicating the reference destination is changed so that the content-guaranteed reference type registration data 230 refers to the original tone data 210.

Figure 7:
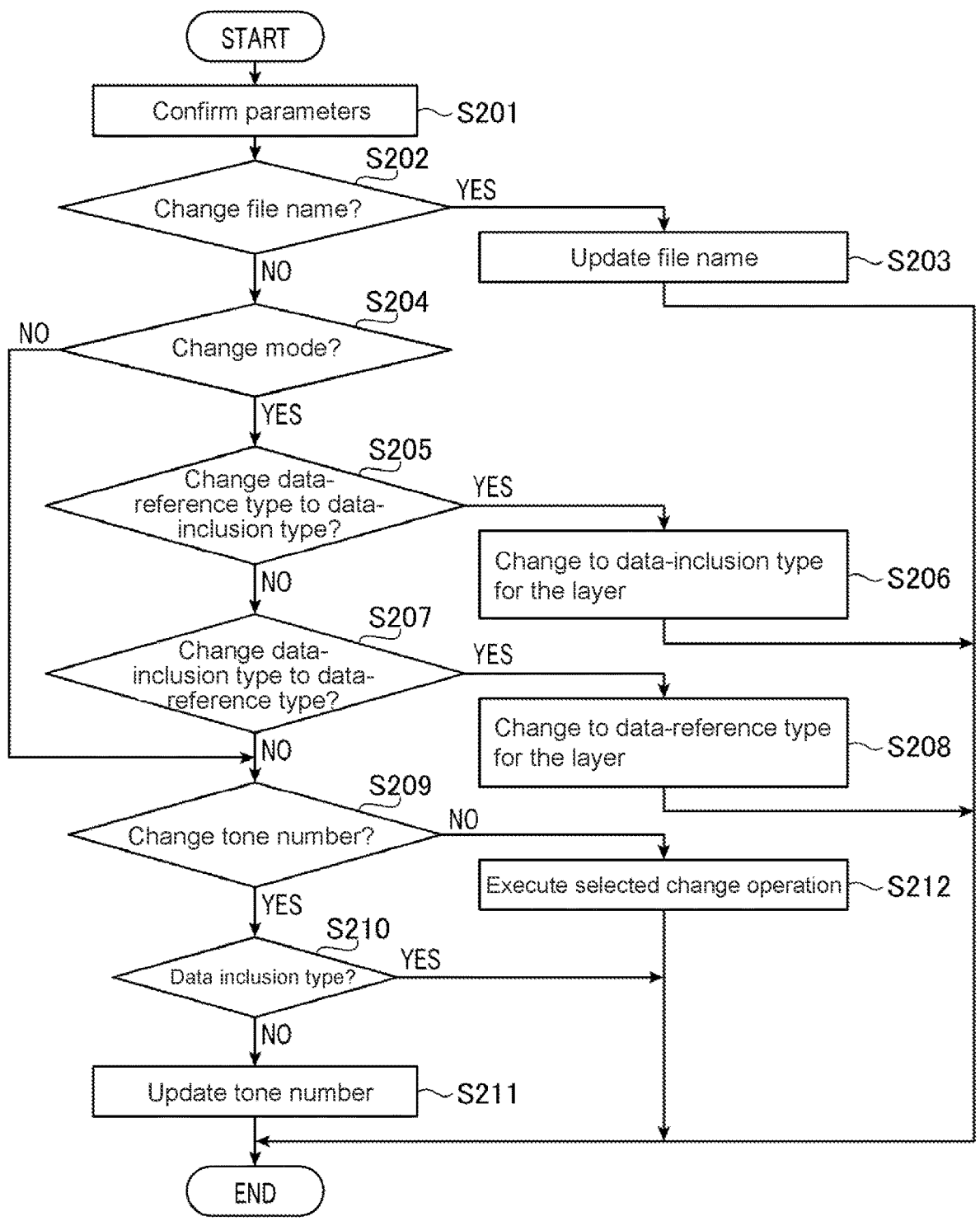
FIG. 7 is a subroutine showing the details of the editing process in step S105 of FIG. 6.

FIG. 7 is a subroutine showing details of the editing process in step S105 of FIG. 6. As shown in FIG. 7, the processor 10 first confirms the parameters defined in the common parameter area CPA (step S201).

When the user performs an operation to change the file name (step S202: YES), the processor 10 updates the file name (step S203). Specifically, in step S203, the processor 10 updates the file name defined in the common parameter area CPA, and also updates the file name of the registration data 230 to be edited, which has been registered in the registration directory 220. The processor 10 saves the updated registration data 230 in the flash ROM 12 and terminates the processing of the flowchart of FIG. 6.

When the user performs an operation to change the layer mode (step S202: NO and step S204: YES), the processor 10 determines whether the operation is a change operation from a reference type (content-dependent reference type or content-guaranteed reference type) to the data inclusion type (step S205).

If it is a change operation from a data reference type to the data inclusion type (step S205: YES), processor 10 changes the corresponding layer from the original data reference type to the data inclusion type (step S206).

Specifically, in step S206, the processor 10 reads the tone data 210 indicated by the tone number described in the tone directory area TDA from the flash ROM 12, and copies it to the corresponding layer. Furthermore, the processor 10 updates the value corresponding to this layer (as described in FIG. 4, the value 0 indicates layer information and the value other than 0 indicates the tone number) to zero, and describes the mode after change (that is, data value 2 indicating a data inclusion type) in the common parameter area CPA. The processor 10 saves the thus updated registration data 230 in the flash ROM 12 and terminates the processing of the flowchart of FIG. 6.

If the change operation is from the data inclusion type to a data reference type (step S205: NO and step S207: YES), the processor 10 changes the corresponding layer from the data inclusion type to a data reference type (step S208).

Specifically, in step S208, the processor 10 writes the tone number indicating the reference destination in the tone directory area TDA, deletes the tone physical data of the corresponding layer, and describes an appropriate mode after the change (that is, the value 0 indicating the content-dependent reference type or value 1 indicating the content-guaranteed reference type) in the common parameter area CPA. The processor 10 saves the updated registration data 230 in the flash ROM 12 and terminates the processing of the flowchart of FIG. 6. Note that the tone number described in the tone directory area TDA is designated by, for example, a user's operation.

When the mode is changed from the content-dependent reference type to the content-guaranteed reference type or from the content-guaranteed reference type to the content-dependent reference type, the processor 10 changes the value of the mode from 0 to 1 or from 1 to 0, and saves it in the flash ROM 12. Thereafter, the processing of the flowchart of FIG. 6 is terminated.

In this way, in the editing process of step S105 in FIG. 6, the processor 10 performs as selection operation receiving process 100a that receives a selection operation by a user selecting one data type from a plurality of selectable data types of the first data (registration data 230) (that is, among the data inclusion type, the content-dependent reference type, and the content-guaranteed reference type), and performs the data saving operation process 100b that saves the first data (registration data 230) in the flash ROM 12, which is an example of a storage unit/memory, based on the data type selected by the selection operation.

By simply changing the mode, the user can change the complex registration data 230 with a hierarchical structure to, for example, a data type that is easy for him/herself to handle.

When the user performs an operation to change the tone number (step S204: NO and step S209: YES), the processor 10 determines whether the mode of the corresponding layer is the data inclusion type (step S210). If it is the data inclusion type (step S210: YES), the processor 10 ends the processing of the flowchart of FIG. 6.

If the mode of the corresponding layer is the data reference type (step S210: NO), in step S211, processor 10 changes the tone number corresponding to this layer described in tone directory area TDA to the tone number specified by the change operation, thereby updating the tone number. The processor 10 saves the updated registration data 230 in the flash ROM 12 and terminates the processing of the flowchart of FIG. 6.

If a change operation is performed for parameters other than the file name, mode, and tone number (step S209: NO), the processor 10 executes a processing according to such a change operation in step S212, and the processing of the flow chart of FIG. 6 terminates.

Here, in this editing process, it has been described that the updated registration data 230 is saved in the flash ROM 12, but the process according to the present disclosure is not limited to this. The updated registration data 230 may be stored in the flash ROM 12 through the writing process in step S107 described below.

If the function detected in step S101 is the function to write the registration data 230 (step S104: NO and step S106: YES), the processor 10 executes a write process to write the registration data 230 to the flash ROM 12 (step S107). The registration data 230 to be written may be, for example, registration data 230 newly created and held in the RAM 11, or registration data 230 edited by the editing process in step S105.

Figure 8:
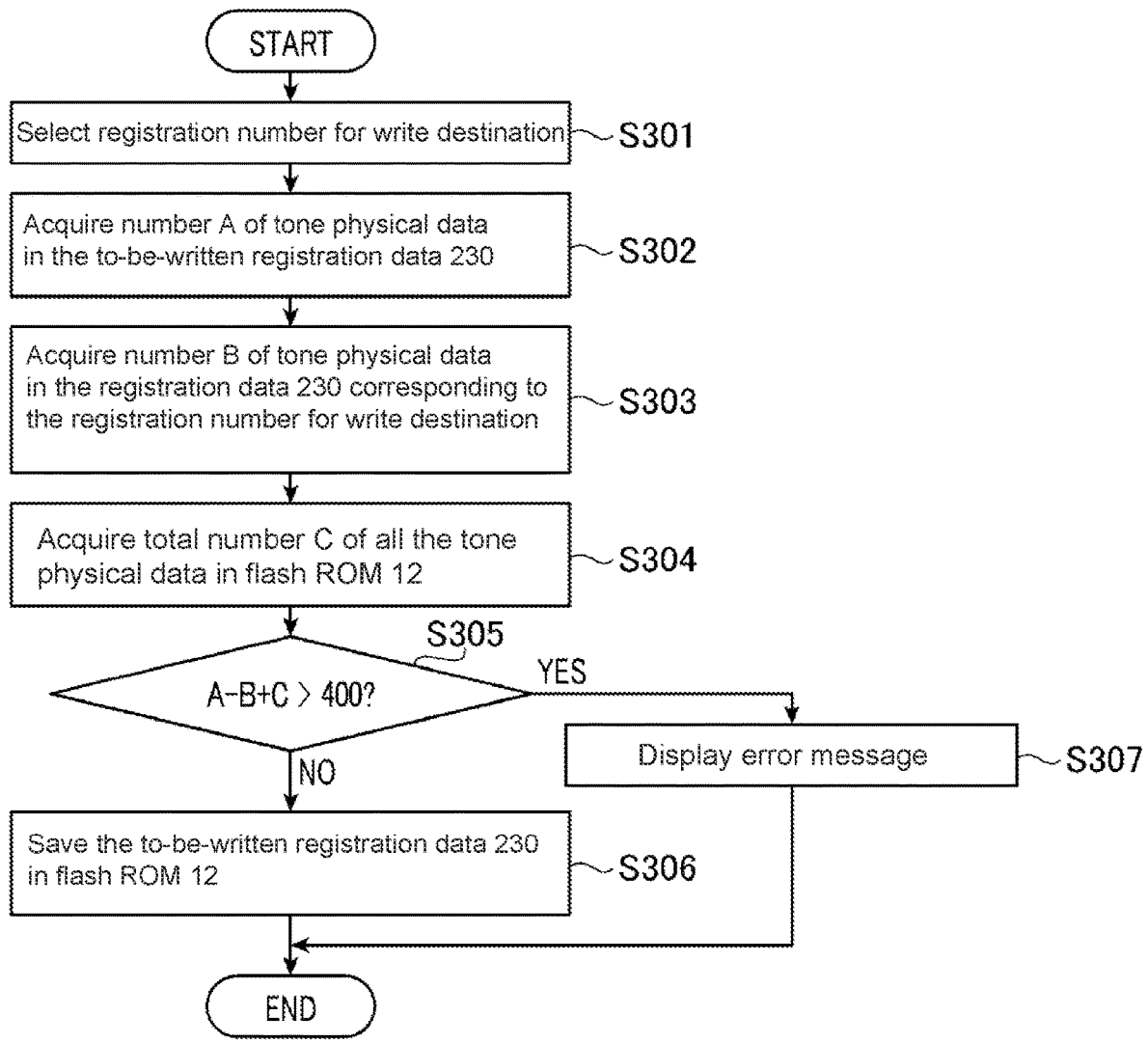
FIG. 8 is a subroutine showing the details of the writing process in step S107 of FIG. 6.

FIG. 8 is a subroutine showing the details of the writing process in step S107 of FIG. 6. As shown in FIG. 8, the processor 10 selects the registration number of the write destination (step S301). The registration number may be a number designated by a user's operation, or a number automatically determined by the processor 10.

The processor 10 acquires the number A of tone physical data included in the registration data 230 to be written (step S302).

The processor 10 acquires the number B of tone physical data included in the registration data 230 corresponding to the registration number of the write destination (step S303). If the registration data 230 corresponding to the registration number has not been registered, the number B of tone physical data acquired here is zero.

The processor 10 acquires the total number C of all the tone physical data stored in the entire flash ROM 12 (step S304).

The processor 10 subtracts the number B obtained in step S303 from the sum of the number A obtained in step S302 and the number C obtained in step S304, and determines whether or not the resulting value is greater than 400 (which is the maximum number of tone physical data that can be included in all of the registration data 230) (step S305).

If the value does not exceed 400 (step S305: NO), the processor 10 saves the to-be-written registration data 230 in the flash ROM 12 (step S306), and terminates the processing of the flowchart of FIG. 6. As a result, the registration data 230 corresponding to the registration number of the write destination is updated.

If the above value exceeds 400 (step S305: YES), the processor 10 displays an error message (step S307) and terminates the processing of the flowchart of FIG. 6. As an example, an error message such as "MEMORY FULL" is displayed. In this case, in order to write the to-be-written registration data 230, the user needs to reduce the number of tone data 210 stored in the flash ROM 12 by, for example, moving part of the registration data 230 in the flash ROM 12 to an external storage medium.

If the function detected in step S101 is the editing function of the tone data 210 (step S106: NO and step S108: YES), the processor 10 executes an editing processing for editing the tone data 210 (step S109). The tone data 210 to be edited is, for example, the tone data 210 corresponding to the layer specified by the user's operation in the registration data 230 selected by the selection function and loaded into the RAM 11.

If the editing target is included in the registration data 230 as tone physical data (that is, if it is of the data inclusion type), the processor 10 changes this tone physical data according to the user's operation. If there is no tone physical data and the referenced tone number is described (that is, if it is of a data reference type), the processor 10 reads the tone data 210 indicated by the referenced tone number from the flash ROM 12, copies it to the corresponding layer, and change this tone data 210 according to the user's operation. The processor 10 stores the changed tone data 210 in the flash ROM 12.

If the function detected in step S101 is the writing function of the tone data 210 (step S108: NO and step S110: YES), the processor 10 executes a writing processing to write the tone data 210 to the flash ROM 12 (step S111). The tone data 210 to be written is, for example, the tone data 210 corresponding to the layer specified by the user's operation in the registration data 230 selected by the selection function and loaded into the RAM 11.

Figure 9:
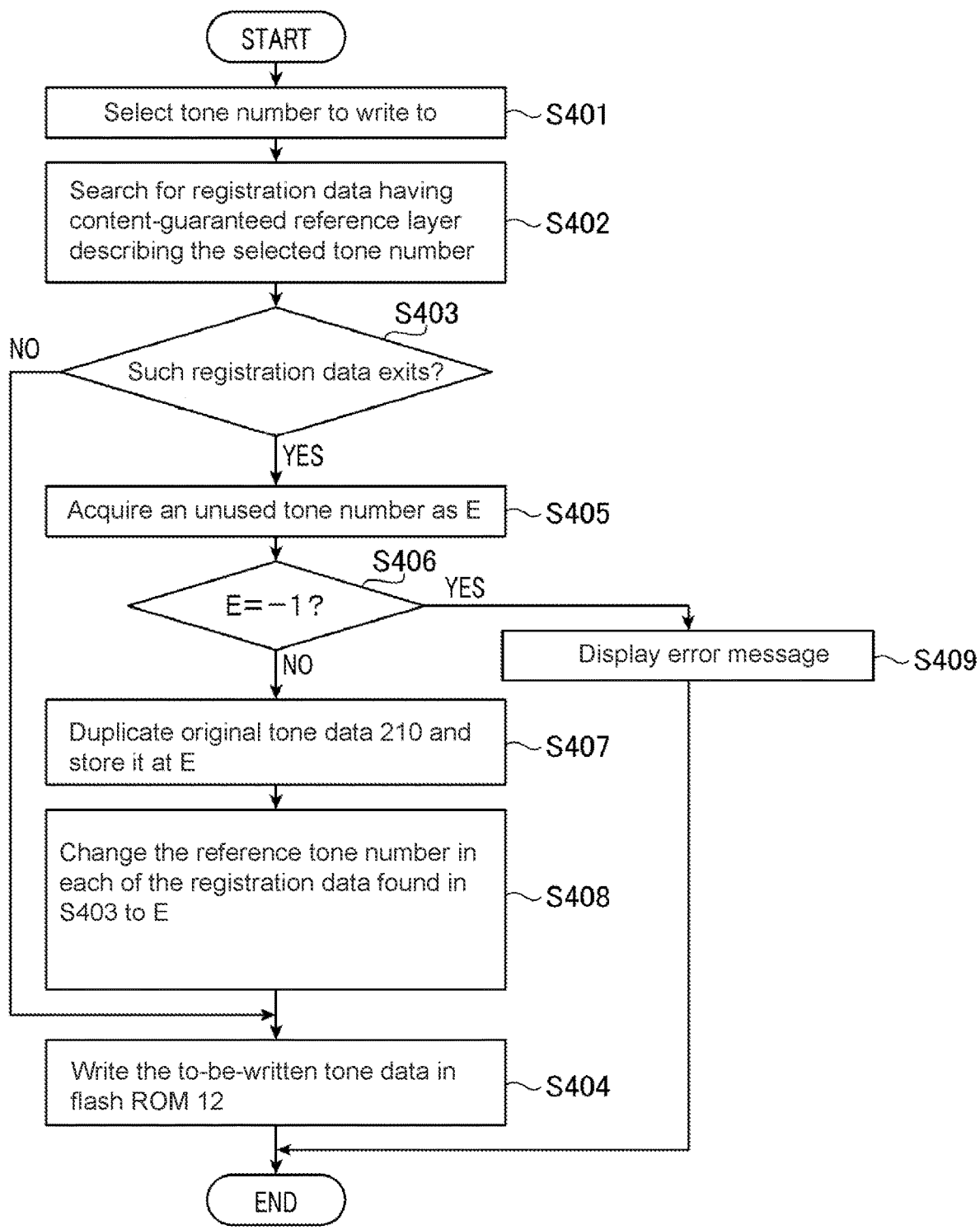
FIG. 9 is a subroutine showing the details of the writing process in step S111 of FIG. 6.

FIG. 9 is a subroutine showing the details of the writing process in step S111 of FIG. 6. As shown in FIG. 9, the processor 10 selects a tone number to write to (step S401). The tone number may be designated by a user's operation, or may be automatically determined by the processor 10.

The processor 10 searches for the registration data 230 that include the content-guaranteed reference layer describing, as the reference destination, the tone number that has been selected in step S402 among the all of the registration data 230 stored in the flash ROM 12.

Then, the processor 10 determines whether or not such registration data 230 exists (step S403). If the corresponding registration data 230 does not exist (step S403: NO), the processor 10 writes the to-be-written tone data 210 in the flash ROM 12 (step S404), and terminates the processing of the flowchart of FIG. 6. As a result, the updated tone data 210 corresponding to the destination tone number is stored in the flash ROM 12.

If the corresponding registration data 230 exists (step S403: YES), the processor 10 searches flash ROM 12 for an unused tone number (that is, a tone number to which a tone data 210 has not been assigned), and acquires an unused tone number found as a result of the search (step S405). The acquired tone number is held as value E. If no unused tone number is found, the value E is set to −1.

If the value E is not −1 (step S406: NO), the processor 10 duplicates the original tone data 210 indicated by the tone number selected in step S401, and saves the duplicated tone data 210 at the tone number indicated by the value E in the flash ROM 12 (step S407).

With respect to all of the applicable layers in the registration data 230 found in step S402 (that is, all content-guaranteed reference-type layers in which the tone number selected in step S401 is described as the reference destination), the processor 10 changes the reference destination tone number to the tone number indicated by the value E (step S408). Next, the processor 10 stores the to-be-written tone data 210 in the flash ROM 12 as the tone data 210 of the tone number selected in step S401 (step S404).

Thus, for a layer defined as content-guaranteed reference type, the tone number described in the tone directory area TDA is rewritten to the new tone number assigned to the duplicated original tone data 210. Since this rewrite processing is performed, the contents of the tone data 210 referred to are the same as before the change. Therefore, these registration data 230 are not affected by changes in tone color caused by changes in tone data 210. Therefore, the user does not have to perform complicated editing work on the registration data 230 in order to avoid unintended changes in tone color.

Note that if writing of the to-be-written tone data 210 into the flash ROM 12 would result in the number of tone physical data in the flash ROM 12 exceeding the maximum number of 400, the processor 10 does not perform the processing of step S408, and displays an error message as in the writing process of S107. Therefore, the process of the flowchart of FIG. 6 is terminated. Further, if the value E is −1 in step S406 (step S406: YES), the processor 10 displays an error message because there is no area in the flash ROM 12 for writing the tone data 210 to be written (step S409), and the process of the flowchart of FIG. 6 is terminated.

Next, operations for handling tone data 210 and registration data 230 using an external storage medium (for example, USB flash memory 2) connected to electronic musical instrument 1 will be described.

If the function detected in step S101 is the function to save the registration data 230 (step S110: NO and step S112: YES), the processor 10 executes a saving process of saving the registration data 230 stored in the flash ROM 12 in the external storage medium (step S113). The registration data 230 to be saved is, for example, the registration data 230 specified by the user's operation.

Figure 10:
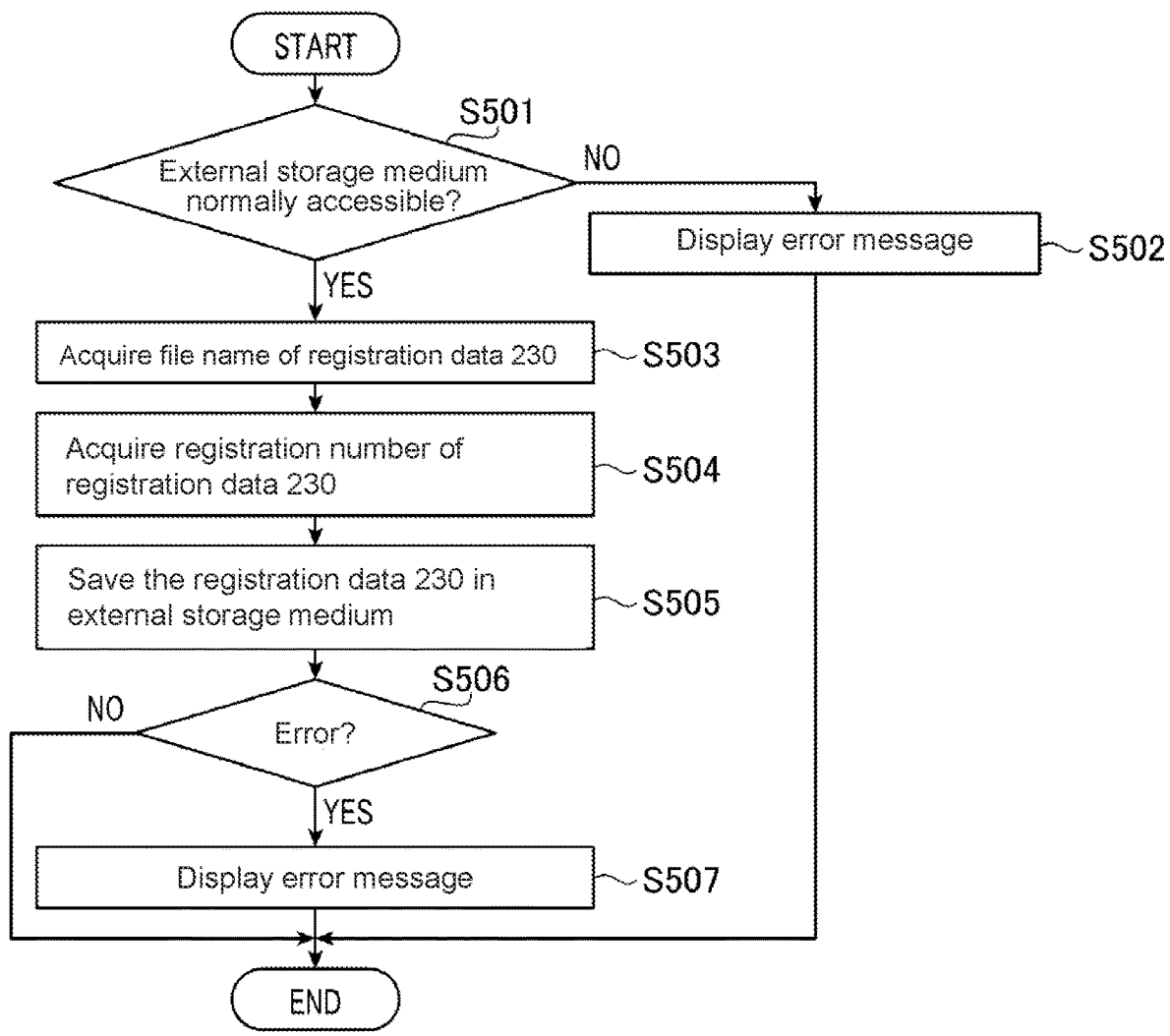
FIG. 10 is a subroutine showing the details of the saving process in step S113 of FIG. 6.

FIG. 10 is a subroutine showing the details of the saving process in step S113 of FIG. 6. As shown in FIG. 10, the processor 10 determines whether or not the storage destination external storage medium can be normally accessed (step S501). For example, if the storage destination external storage medium is not connected to the electronic musical instrument 1, normal access cannot be performed. In this case (step S501: NO), the processor 10 displays an error message (step S502) and terminates the processing of the flowchart of FIG. 6.

If the storage destination external storage medium can be normally accessed (step S501: YES), the processor 10 acquires the file name (step S503) and the registration number (step S504) of the registration data 230 to be saved.

The processor 10 saves the image file of the registration data 230 indicated by the registration number acquired in step S504 in the external storage medium with the file name acquired in step S503 (step S505).

While writing to the external storage medium, an error will occur if there is insufficient free space on the external storage medium. If such an error occurs (step S506: YES), the processor 10 displays an error message (step S507), cancels writing to the external storage medium, and terminates the processing of the flowchart of FIG. 6. If no such error occurs (step S506: NO), the registration data 230 is normally saved in the external storage medium. Note that if the registration data 230 with the same file name has already been stored in the external storage medium, it is overwritten.

This say, the user can save the registration data 230 stored in the flash ROM 12 to an external storage medium while maintaining the data type by using the saving function of the registration data 230. As an example, the user can save the reference-type registration data 230 with a small data size in the external storage medium as it is. The saving function of the registration data 230 is useful when it is easier for the user to handle the registration data 230 while maintaining the data type thereof.

If the function detected in step S101 is the function to load the registration data 230 (step S112: NO and step S114: YES), the processor 10 executes a load process of loading the registration data 230 stored in the external storage medium into the flash ROM 12 (step S115). The registration data 230 to be loaded and saved is, for example, the registration data 230 specified by the user's operation.

Figure 11:
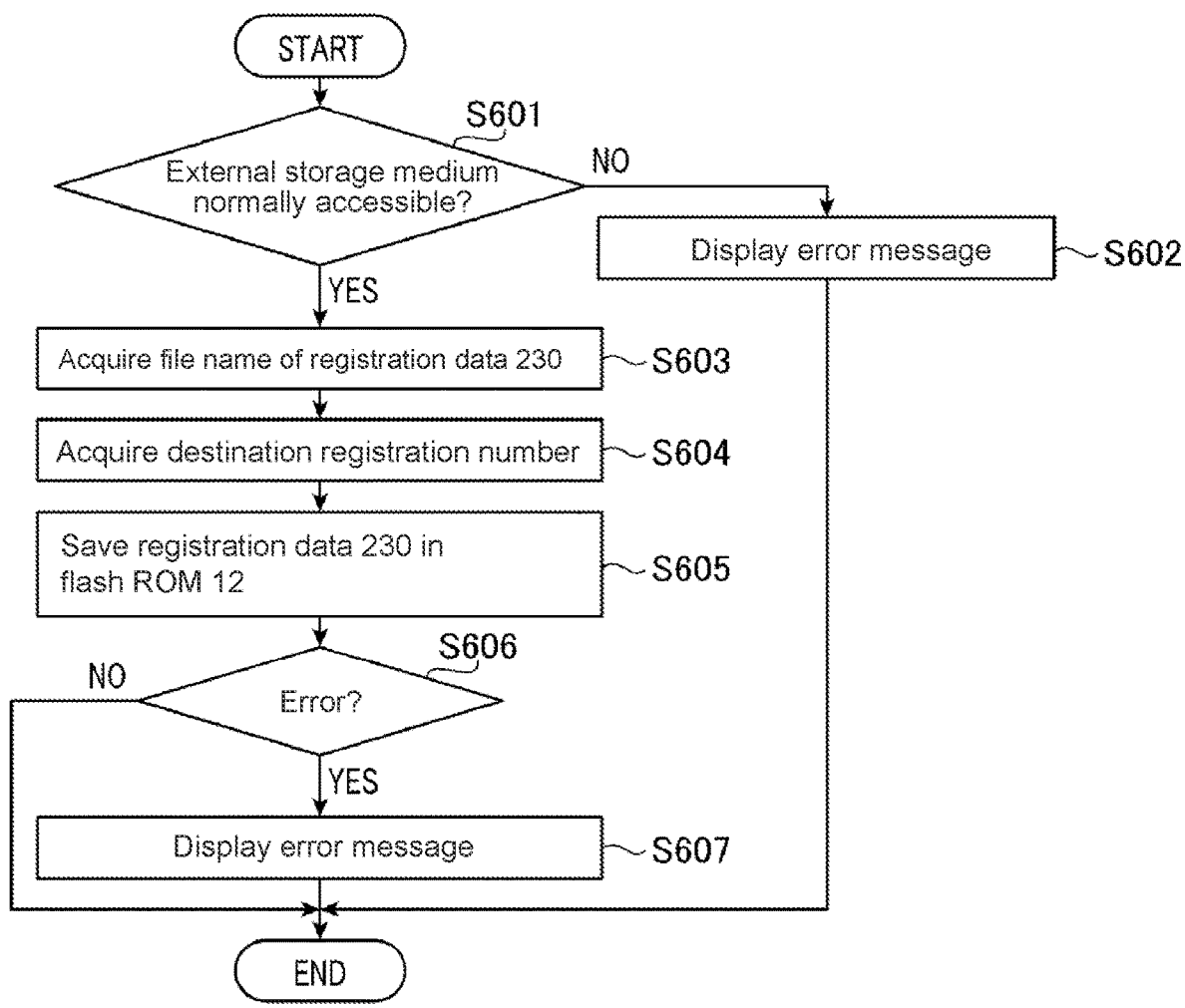
FIG. 11 is a subroutine showing the details of the loading process in step S115 of FIG. 6.

FIG. 11 is a subroutine showing the details of the load processing in step S115 of FIG. 6. As shown in FIG. 11, the processor 10 determines whether or not it is possible to access the storage source external storage medium normally (step S601). For example, if the external storage medium, which is the storage source, is not connected to the electronic musical instrument 1, normal access cannot be performed. In this case (step S601: NO), the processor 10 displays an error message (step S602) and terminates the processing of the flowchart of FIG. 6.

If the storage source external storage medium can be normally accessed (step S601: YES), the processor 10 acquires the file name of the registration data 230 to be stored (step S603), and acquires the registration number in the flash ROM 12, which is the save destination (step S604). The destination registration number may be a number designated by a user's operation, or may be a number automatically determined by the processor 10.

The processor 10 saves the image file of the to-be-saved registration data 230 in the flash ROM 12 with the file name obtained in step S603 as the registration data 230 having the registration number obtained in step S604 (step S605).

If the free space in the flash ROM 12 is insufficient during writing to the flash ROM 12, an error will occur. If such an error occurs (step S606: YES), the processor 10 displays an error message (step S607), cancels writing to the flash ROM 12, and terminates the processing of the flowchart of FIG. 6. If no such error occurs (step S606: NO), the registration data 230 is normally stored in the flash ROM 12. Here, the registration data 230 of the registration number of the save destination is overwritten.

By using the registration data 230 load function, the user can store the registration data 230 stored in the external storage medium in the flash ROM 12 while maintaining the data type. As an example, the user can store data-inclusion type registration data 230 in flash ROM 12 with its original data type. The function of loading the registration data 230 is useful when it is easier for the user to handle the registration data 230 while maintaining the data type thereof.

If the function detected in step S101 is the automatic saving function of registration data 230 (step S114: NO and step S116: YES), the processor 10 executes an automatic save process of saving registration data 230 stored in flash ROM 12 to an external storage medium (step S117). The registration data 230 to be saved is, for example, the registration data 230 specified by the user's operation.

Figure 12:
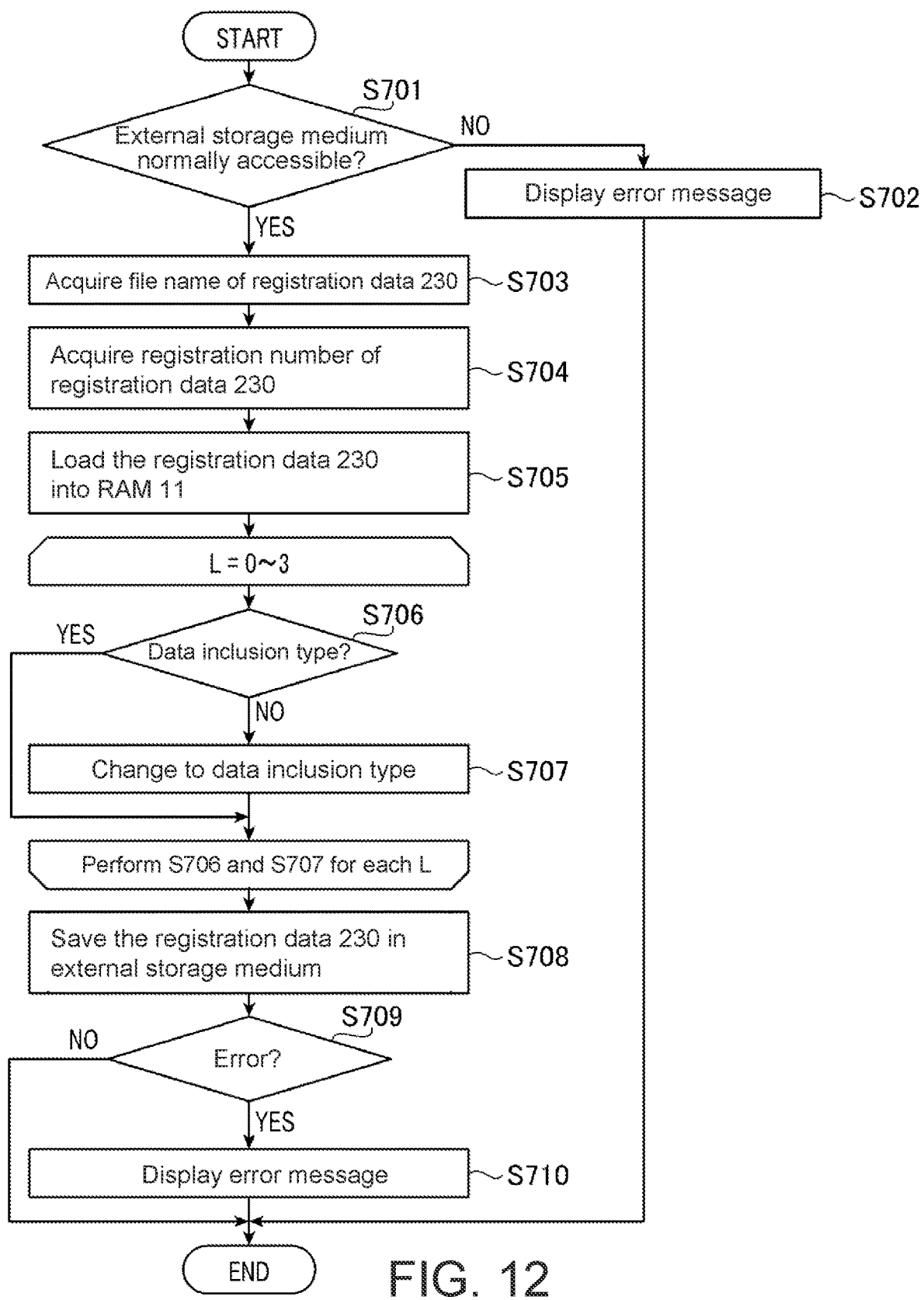
FIG. 12 is a subroutine showing the details of the automatic saving processing in step S117 of FIG. 6.

FIG. 12 is a subroutine showing the details of the automatic save processing in step S117 of FIG. 6. Schematically, in response to a prescribed operation by the user (an operation of selecting the automatic saving function of the registration data 230), the processor 10 converts a reference-type registration data 230 (first data) stored in the flash ROM 12, which is an example of a storage unit, into a data inclusion type and stores it in an external storage medium.

Specifically, as shown in FIG. 12, the processor 10 first determines whether or not the storage destination external storage medium can be normally accessed (step S701). If the storage destination external storage medium cannot be normally accessed (step S701: NO), the processor 10 displays an error message (step S702) and terminates the processing of the flowchart of FIG. 6.

If the storage destination external storage medium can be normally accessed (step S701: YES), the processor 10 acquires the file name (step S703) and the registration number (step S704) of the registration data 230 to be saved.

The processor 10 loads the image file of the registration data 230 indicated by the registration number acquired in step S704 into the RAM 11 (step S705).

In the flowchart of FIG. 12, when the value L is set to 0, the processing target is layer 1, when the value L is set to 1, the processing target is layer 2, when the value L is set to 2, the processing target is layer 3, and when the value L is set to 3, the processing target is layer 4. The processor 10 executes the process of step S706 for each of the layers 1 to 4 of the registration data 230 loaded into the RAM11.

Specifically, in step S706, the processor 10 determines whether or not the mode described in the common parameter area CPA for the layer being processed is the data inclusion type (step S706). If it is the data inclusion type (step S706: YES), the processor 10 does not change the layer. If it is not the data inclusion type (that is, a reference type) (step S706: NO), the processor 10 changes the layer being processed to the data inclusion type (step S707). Specifically, in S707, the processor 10 copies the tone data 210 indicated by the referenced tone number into the layer being processed, changes the value corresponding to this layer described in the tone directory area TDA (see FIG. 4; the value 0 indicates layer information, and the value other than 0 indicates the tone number) to 0, and sets the mode after the change (that is, the value 2 indicating the data inclusion type) in the common parameter area CPA. By executing this process, if the registration data 230 loaded into the RAM 11 is of a reference type, it is automatically converted to the all-inclusive type.

The processor 10 saves the thus processed registration data 230 loaded into the RAM 11 in the external storage medium under the file name obtained in step S703 (step S708).

While writing to the external storage medium, an error will occur if there is insufficient free space on the external storage medium. If such an error occurs (step S709: YES), the processor 10 displays an error message (step S710), cancels writing to the external storage medium, and terminates the processing of the flowchart of FIG. 6. If no such error occurs (step S709: NO), the registration data 230 is normally saved in the external storage medium. Note that if the registration data 230 with the same file name has already been stored in the external storage medium, it is overwritten.

By using the automatic storage function of the registration data 230, the user can automatically convert the reference-type (or mixed-type) registration data 230 stored in the flash ROM 12 into the all-inclusive registration data 230 that is excellent in terms of portability, and can save it in an external storage medium. For example, the user can use the registration data 230 in another electronic musical instrument simply by copying the all-inclusive registration data 230 saved in the external storage medium to another electronic musical instrument. The auto-save feature of registration data 230 is useful when all-inclusive registration data 230 is suitable to users.

The user can select either the saving function (see FIG. 10) or the automatic saving function (see FIG. 12) of the registration data 230; that is whether to save the registration data 230 in the external storage medium while maintaining the data type, or to save it in the external storage medium after changing it to the all-inclusive type, if necessary. That is, the operation of selecting either the saving function or the automatic saving function of the registration data 230 is an operation that can be received by the selection operation receiving process 100a. This is an example of an operation of selecting a particular data type from a plurality of the data types (i.e., data inclusion type, content-dependent reference type and content-guaranteed reference type) of the first data (registration data 230).

If the function detected in step S101 is the automatic loading function of the registration data 230 (step S116: NO and step S118: YES), the processor 10 executes an automatic load process of loading the registration data 230 stored in the external storage medium into the flash ROM 12 (step S119). The registration data 230 to be saved is, for example, the registration data 230 specified by the user's operation.

Figure 13:
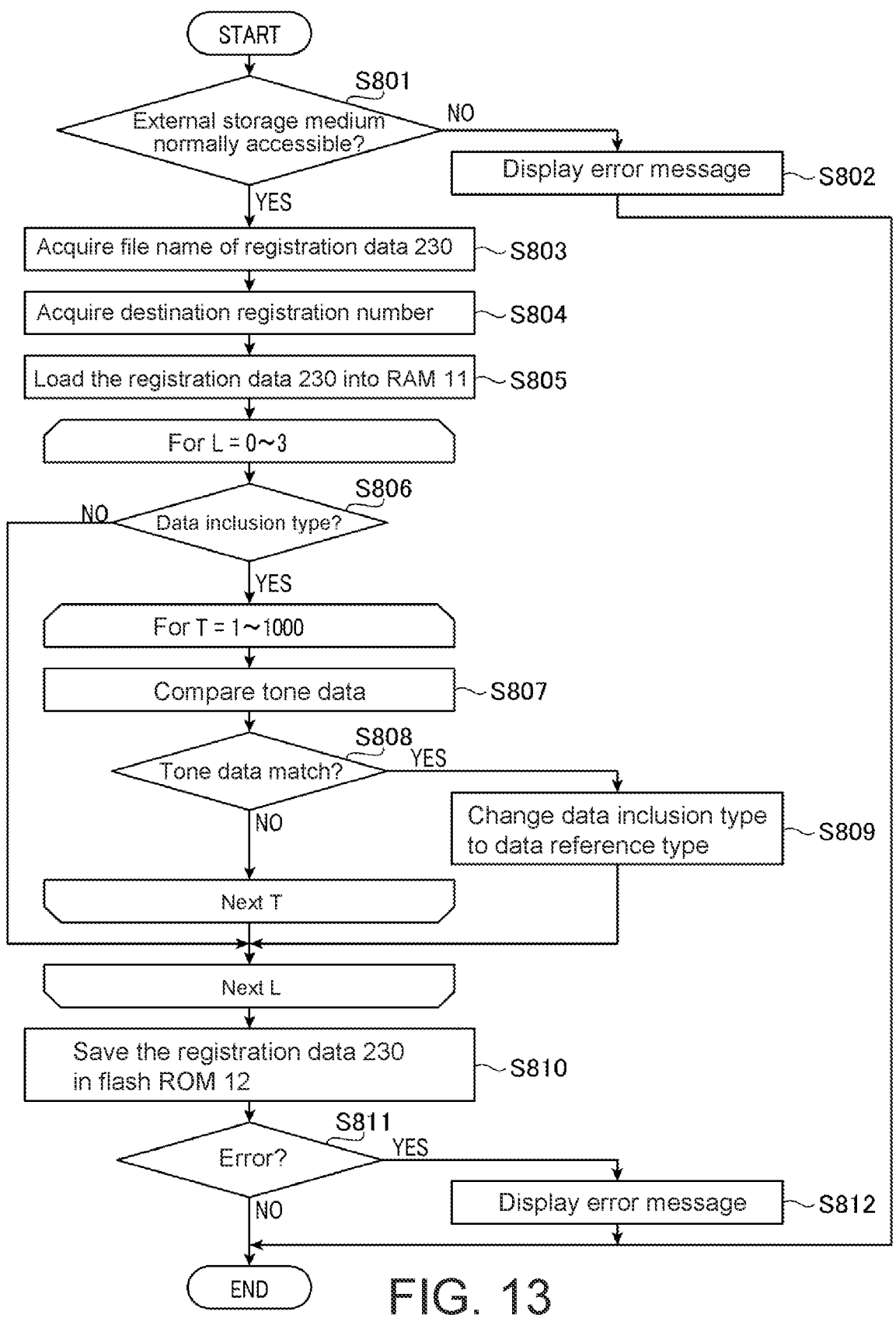
FIG. 13 is a subroutine showing the details of the automatic loading process in step S119 of FIG. 6.

FIG. 13 is a subroutine showing the details of the automatic loading process in step S119 of FIG. 6. Schematically, the processor 10 determines whether a tone data 210 (second data) in a registration data 230 (first data) stored in an external storage medium is stored in in flash ROM 12, which is an example of a storage unit, and if the tone data 210 is stored in the flash ROM 12, the data inclusion type registration data 230 in the external storage medium is converted to a reference type that refers to the tone data 210 stored in the flash ROM 12.

Specifically, as shown in FIG. 13, the processor 10 first determines whether or not it is possible to normally access the storage source external storage medium (step S801). If the storage source external storage medium cannot be normally accessed (step S801: NO), the processor 10 displays an error message (step S802) and terminates the processing of the flowchart of FIG. 6.

If the storage source external storage medium can be normally accessed (step S801: YES), the processor 10 acquires the file name of the registration data 230 to be saved (step S803), and acquires the destination registration number in the flash ROM 12 (step S804). The registration number of the save destination may be a number designated by a user's operation, or may be a number automatically determined by the processor 10.

The processor 10 reads the registration data 230 of the file name acquired in step S803 from the external storage medium and loads it into the RAM 11 (step S805).

The processor 10 executes the process of step S806 for each of the layers 1 to 4 of the registration data 230 that has been loaded into the RAM 11.

Specifically, in step S806, the processor 10 determines whether or not the mode described in the common parameter area CPA for the layer being processed is the data inclusion type (step S806). If it is the data inclusion type (step S806: YES), the processor 10 compares the tone physical data held by the layer being processed and each of the tone data 210 indicated by the tone numbers (value T=1 to 1,000) stored in the flash ROM 12 (step S807). If the content of the tone physical data held by the layer being processed matches the content of the tone data 210 that has been compared (step S808: YES), the processor 10 changes the layer being processed from the data inclusion type to the content-guarantee reference type (step S809). Specifically, in step S809, the processor 10 changes the mode of the layer being processed to the content-guaranteed reference type, describes, as the reference destination, the tone number indicating the tone data 210 whose contents match the layer being processed, and deletes the tone physical data of the layer being processed. Note that if the layer is not of the data inclusion type (that is, if it is of the reference type) (step S806: NO), the processor 10 does not change the layer being processed. Further, if there is no tone data 210 whose content matches (step S808: NO), the processor 10 does not change the layer being processed. By executing the above processing, the data inclusion type layer in the registration data 230 that has been loaded into the RAM 11 is automatically converted to the content-guaranteed reference type.

The processor 10 saves the registration data 230 loaded into the RAM 11 in the flash ROM 12 as the registration data 230 with the file name obtained in step S803 and the registration number obtained in step S804 (step S810).

If the free space in the flash ROM 12 is insufficient during writing to the flash ROM 12, an error will occur. When such an error occurs (step S811: YES), the processor 10 displays an error message (step S812), cancels writing to the flash ROM 12, and terminates the processing of the flowchart of FIG. 6. If no such error occurs (step S811: NO), the registration data 230 is stored in the flash ROM 12. Note that the registration data 230 of the registration number of the save destination is overwritten.

By using the automatic loading function of the registration data 230, the data inclusion type layers in the registration data 230 stored in the external storage medium are auto-converted to the data reference type with a small data size (the content-guaranteed reference type in this example), and then the converted registration data 230 is stored in the flash ROM 12. Thereby, the registration data 230 is efficiently managed in the flash ROM 12. Further, since it is the content-guaranteed reference type, an unintended change in tone color due to a change in the reference destination tone data 210 does not occur. The automatic loading function of the registration data 230 is useful when the reference-type registration data 230 is easy for the user to handle. Here, the automatic load function may automatically convert to the content-dependent reference type instead of the content-guaranteed reference type.

The user can select either the load function (see FIG. 11) or the automatic load function (see FIG. 13) for registration data 230 in saving the registration data 230 in the flash ROM 12; i.e. whether to save it in the flash ROM 12 while maintaining the data type, or after changing it to the reference type if necessary. That is, the operation of selecting either the loading function or the automatic loading function of the registration data 230 is an operation that can be received by the selection operation receiving process 100a, and is an example of an operation of selecting one data type from from a plurality of data types (that is, the data inclusion type, the content-dependent reference type, and the content-guaranteed reference type) of first data (registration data 230)

If the function detected in step S101 is the function of saving tone data 210 (step S120: YES), the processor 10 executes a saving process of saving tone data 210 stored in flash ROM 12 to an external storage medium. (Step S121). The tone data 210 to be saved is, for example, tone data 210 designated by a user's operation.

The processor 10 saves the image file of the tone data 210 to be saved in the external storage medium with the file name of the tone data 210 to be saved. Note that if the tone data 210 with the same file name has already been saved in the external storage medium, it will be overwritten. If the storage destination external storage medium is not connected to the electronic musical instrument 1 or the free space of the external storage medium is insufficient, the storage process in step S121 ends with an error.

If the function detected in step S101 is the function to load the tone data 210 (step S122: YES), the processor 10 executes a loading process of saving the tone data 210 saved in the external storage medium to the flash ROM 12 (step S123). The tone data 210 to be saved is, for example, tone data 210 designated by a user's operation.

Specifically, in step S123, the processor 10 saves the image file of the tone data 210 to be saved in the flash ROM 12 as the tone data 210 having the tone number designated by the user's operation or the like with the file name of the tone data 210 to be saved. Note that the tone data 210 of the tone number of the storage destination is overwritten. If, for example, the connection of the external storage medium to the electronic musical instrument 1 is cut during writing to the flash ROM 12, the saving process in step S123 ends with an error.

If the function detected in step S101 is other than the functions described above, the processor 10 executes processing according to such a selected function (step S124), and terminates the processing of the flowchart of FIG. 6.

As described above, the present embodiment provides the electronic musical instrument 1, the data processing method, and data processing program 120 executed by the processor 10 of the electronic musical instrument 1, which is an example of a computer, which can facilitate handling of data having a hierarchical structure.

In the above embodiments, in the reference type, the tone data 210 stored in the flash ROM 12 is always set as a reference destination, but the configuration of the present disclosure is not limited to this. For example, when two mixed-type registration data 230 are loaded into the RAM 11 and these registration data 230 include reference-type layers that refer to a common tone data 210, one registration data 230 may refer to the tone data 210 stored in the flash ROM 12, and the other registration data 230 may refer to a corresponding layer in the one registration data referring to the same tone data 210 (i.e., a layer in said one registration data 230 loaded into RAM 11).

In the above embodiment, the data processing program is stored in the flash ROM 12, but the present disclosure is not limited to this; the data processing program may be stored in a removable storage medium such as a USB memory, CD, DVD, etc., or may be stored in a server. The electronic musical instrument 1 may acquire the data processing program from such a storage medium, or may acquire it from a server via a network.

In addition, the present invention is not limited to the above-described embodiments, and can be variously modified in the implementation stage without departing from the gist of the present invention. Also, the functions executed in the above-described embodiments may be combined as appropriate as possible. Various steps are included in the above-described embodiments, and various inventions can be extracted by appropriately combining the disclosed multiple constituent elements. For example, even if some constituent elements are deleted from all the constituent elements shown in the embodiments, if an effect can be obtained, a configuration in which these constituent elements are deleted can be extracted as an invention. It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An electronic device, comprising at least one processor configured to perform the following:
   receiving a selection operation from a user that selects one of a plurality of data types for a first data, the first data having a hierarchical structure, the plurality of data types being different from each other at least in terms of a way the first data is associated with a second data that is described at a different level in the hierarchical structure; and
   adapting the first data in accordance with the data type selected by the selection operation, and causing the adapted first data to be saved in a memory,
   wherein one of the plurality of data types is a second reference type in which the first data refers to the second data, and the first data of the second reference type includes reference information that refers to the second data, and
   wherein when the second data that is referred to by the first data of the second reference type has been changed, the at least one processor duplicates the second data before being changed, and modifies the reference information of the first data of the second reference type such that the first data of the second reference type refers to the duplicated second data before being changed.

2. The electronic device according to claim 1, wherein one of the plurality of data types is a first reference type in which the first data refers to the second data, and the first data of the first reference type includes reference information that refers to the second data.

3. The electronic device according to claim 1, wherein one of the plurality of data types is a data inclusion type in which the first data includes physical data of the second data therein.

4. The electronic device according to claim 1,
   wherein one of the plurality of data types is a reference type in which the first data refers to the second data, and another of the plurality of data types is a data inclusion type in which the first data includes physical data of the second data therein, and
   wherein the at least one processor is configured to, in response to a prescribed operation by the user, convert the first data of the reference type stored in said memory to the first data of the data inclusion type and save the converted first data of the data inclusion type in an external storage medium.

5. The electronic device according to claim 1,
   wherein one of the plurality of data types is a reference type in which the first data refers to the second data, and another of the plurality of data types is a data inclusion type in which the first data includes physical data of the second data therein, and
   wherein the at least one processor is configured to determine whether the second data included in the first data of the data inclusion type stored in an external storage medium is stored in the memory, and if said second data is stored in the memory, convert the first data of the data inclusion type stored in the external storage medium to the first data of the reference type in which the first data refers to the second data stored in the memory, and save the converted first data of the reference type in the memory.

6. The electronic device according to claim 1, wherein the first data includes registration data, the second data includes tone data.

7. The electronic device according to claim 1,
   wherein the plurality of data types include a first reference type, a second reference type, and a data inclusion type, all of which are selectable by said selection operation by the user,
   wherein in the first reference type, the first data refers to the second data, and the first data of the first reference type includes reference information that refers to the second data,
   wherein when the second data that is referred to by the first data of the first reference type has been changed, the at least one processor does not change the reference information of the first data of the first reference type so that the first data of the first reference type refers to the changed second data,
   wherein in the second reference type, the first data refers to the second data, and the first data of the second reference type includes reference information that refers to the second data,
   wherein when the second data that is referred to by the first data of the second reference type has been changed, the at least one processor duplicates the second data before being changed, and modifies the reference information of the first data of the second reference type such that the first data of the second reference type refers to the duplicated second data before being changed, and
   wherein in the data inclusion type, the first data includes physical data of the second data therein.

8. A method performed by at least one processor in an electronic device, comprising:
   receiving a selection operation from a user that selects one of a plurality of data types for a first data, the first data having a hierarchical structure, the plurality of data types being different from each other at least in terms of a way the first data is associated with a second data that is described at a different level in the hierarchical structure; and
   adapting the first data in accordance with the data type selected by the selection operation, and causing the adapted first data to be saved in a memory,
   wherein one of the plurality of data types is a second reference type in which the first data refers to the second data, and the first data of the second reference type includes reference information that refers to the second data, and
   wherein the method further comprises, when the second data that is referred to by the first data of the second reference type has been changed, duplicating the second data before being changed, and modifying the reference information of the first data of the second reference type such that the first data of the second reference type refers to the duplicated second data before being changed.

9. The method according to claim 8, wherein one of the plurality of data types is a first reference type in which the first data refers to the second data, and the first data of the first reference type includes reference information that refers to the second data.

10. The method according to claim 8, wherein one of the plurality of data types is a data inclusion type in which the first data includes physical data of the second data therein.

11. The method according to claim 8,
wherein one of the plurality of data types is a reference type in which the first data refers to the second data, and another of the plurality of data types is a data inclusion type in which the first data includes physical data of the second data therein, and
wherein the method further comprises, in response to a prescribed operation by the user, converting the first data of the reference type stored in said memory to the first data of the data inclusion type and saving the converted first data of the data inclusion type in an external storage medium.

12. The method according to claim 8,
wherein one of the plurality of data types is a reference type in which the first data refers to the second data, and another of the plurality of data types is a data inclusion type in which the first data includes physical data of the second data therein, and
wherein the method further comprises determining whether the second data included in the first data of the data inclusion type stored in an external storage medium is stored in the memory, and if said second data is stored in the memory, converting the first data of the data inclusion type stored in the external storage medium to the first data of the reference type in which the first data refers to the second data stored in the memory, and saving the converted first data of the reference type in the memory.

13. The method according to claim 8, wherein the first data includes registration data, the second data includes tone data.

14. The method according to claim 8,
wherein the plurality of data types include a first reference type, a second reference type, and a data inclusion type, all of which are selectable by said selection operation by the user,
wherein in the first reference type, the first data refers to the second data, and the first data of the first reference type includes reference information that refers to the second data,
wherein when the second data that is referred to by the first data of the first reference type has been changed, the reference information of the first data of the first reference type is not changed so that the first data of the first reference type refers to the changed second data,
wherein in the second reference type, the first data refers to the second data, and the first data of the second reference type includes reference information that refers to the second data,
wherein when the second data that is referred to by the first data of the second reference type has been changed, the second data before being changed is duplicated, and the reference information of the first data of the second reference type is modified such that the first data of the second reference type refers to the duplicated second data before being changed, and
wherein in the data inclusion type, the first data includes physical data of the second data therein.

15. An electronic device, comprising at least one processor configured to perform the following:
receiving a selection operation from a user that selects one of a plurality of data types for a first data, the first data having a hierarchical structure, the plurality of data types being different from each other at least in terms of a way the first data is associated with a second data that is described at a different level in the hierarchical structure; and
adapting the first data in accordance with the data type selected by the selection operation, and causing the adapted first data to be saved in a memory,
wherein one of the plurality of data types is a reference type in which the first data refers to the second data, and another of the plurality of data types is a data inclusion type in which the first data includes physical data of the second data therein, and
wherein the at least one processor is configured to, in response to a prescribed operation by the user, convert the first data of the reference type stored in said memory to the first data of the data inclusion type and save the converted first data of the data inclusion type in an external storage medium.

16. An electronic device, comprising at least one processor configured to perform the following:
receiving a selection operation from a user that selects one of a plurality of data types for a first data, the first data having a hierarchical structure, the plurality of data types being different from each other at least in terms of a way the first data is associated with a second data that is described at a different level in the hierarchical structure; and
adapting the first data in accordance with the data type selected by the selection operation, and causing the adapted first data to be saved in a memory,
wherein the plurality of data types include a first reference type, a second reference type, and a data inclusion type, all of which are selectable by said selection operation by the user,
wherein in the first reference type, the first data refers to the second data, and the first data of the first reference type includes reference information that refers to the second data,
wherein when the second data that is referred to by the first data of the first reference type has been changed, the at least one processor does not change the reference information of the first data of the first reference type so that the first data of the first reference type refers to the changed second data,
wherein in the second reference type, the first data refers to the second data, and the first data of the second reference type includes reference information that refers to the second data,
wherein when the second data that is referred to by the first data of the second reference type has been changed, the at least one processor duplicates the second data before being changed, and modifies the reference information of the first data of the second reference type such that the first data of the second reference type refers to the duplicated second data before being changed, and
wherein in the data inclusion type, the first data includes physical data of the second data therein.

17. A method performed by at least one processor in an electronic device, comprising:
receiving a selection operation from a user that selects one of a plurality of data types for a first data, the first data having a hierarchical structure, the plurality of data types being different from each other at least in terms of a way the first data is associated with a second data that is described at a different level in the hierarchical structure; and
adapting the first data in accordance with the data type selected by the selection operation, and causing the adapted first data to be saved in a memory, wherein one of the plurality of data types is a reference type in which the first data refers to the second data, and another of the plurality of data types is a data inclusion type in which the first data includes physical data of the second data therein, and wherein the method further comprises, in response to a prescribed operation by the user, converting the first data of the reference type stored in said memory to the first data of the data inclusion type and saving the converted first data of the data inclusion type in an external storage medium.

\* \* \* \* \*